July 11, 1933.   W. F. SCHACHT   1,917,737
COMPOSITE RUBBER SOLE AND METHOD OF MAKING SAME
Filed July 12, 1932
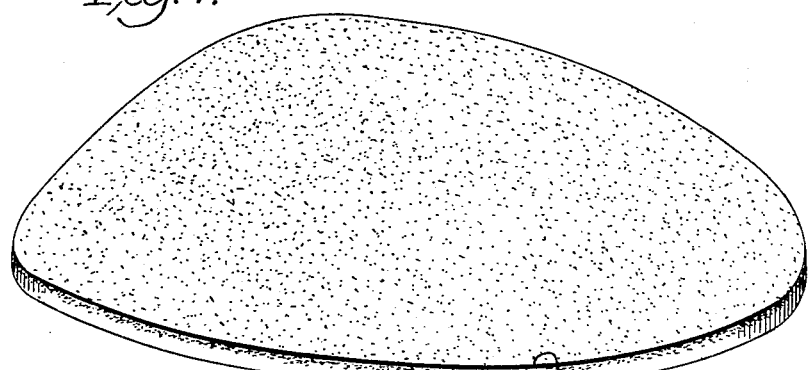
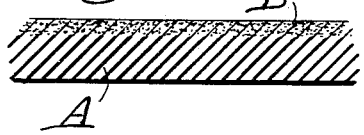 
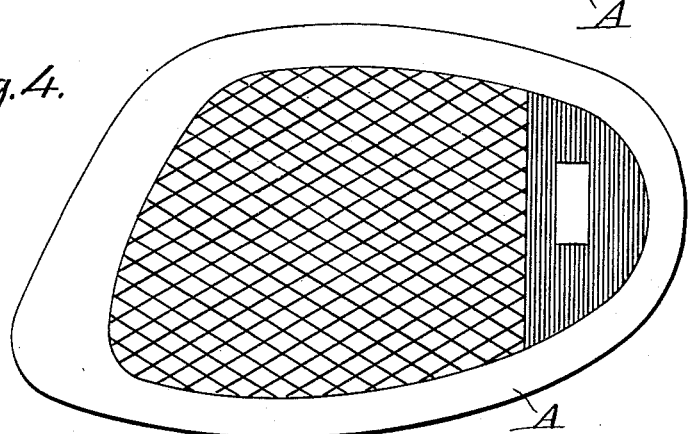
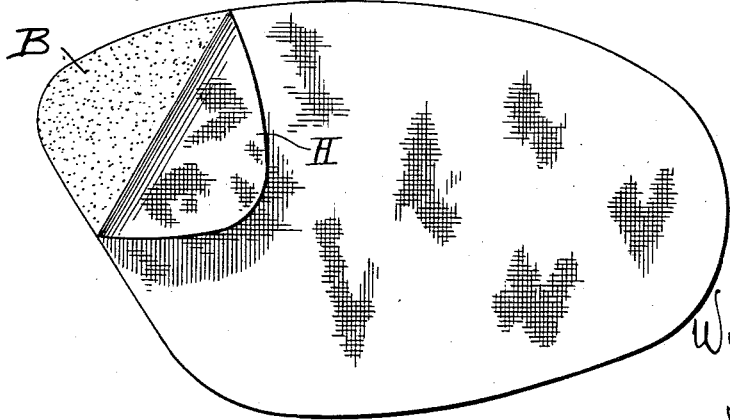
Inventor
William F. Schacht
By Alexander McDowell
Attorneys Patented July 11, 1933

1,917,737

UNITED STATES PATENT OFFICE

WILLIAM F. SCHACHT, OF HUNTINGTON, INDIANA

COMPOSITE RUBBER SOLE AND METHOD OF MAKING SAME

Application filed July 12, 1932. Serial No. 622,136.

This invention is a novel composite unlaminated rubber sole and method of making same, the sole being adapted to be attached by use of rubber cement and solvents directly to the leather soles of boots, shoes, or the like, without resorting to the use of nails or stitching, thereby providing a neat, serviceable and economical rubber sole readily applicable to the leather sole of an old or new shoe without removing any of the layers of such leather sole.

The principal object of the invention is to provide a novel method of producing such composite rubber sole in a single unlaminated piece, said sole as prepared for vulcanization comprising an unlaminated sole blank having a lower or tread portion of vulcanizable rubber, and having an upper or attaching surface or portion of unvulcanizable "tacky" and readily soluble rubber milled and rolled onto the tread portion before vulcanization by means of calender rolls with heat and extreme pressure to form with the tread portion one solid mass as distinguished from separate rubber layers or laminations of different characteristics united together, the sole blank thus formed being subsequently subjected to vulcanization for a brief time sufficient to cure the tread portion of the sole.

A further object of the invention is to provide a composite rubber sole of the above described character in which the unvulcanizable "tacky" surface of the sole blank contains a small amount of vulcanizing agent, such as sulphur, as distinguished from raw milled rubber entirely devoid of any vulcanizing agent. I have found that the inclusion of a small amount of sulphur gives a better attaching surface for the sole in that it prevents to a large degree so-called "creeping" of the rubber sole on the leather sole, especially in hot weather, the amount of sulphur however being insufficient to alter to any appreciable degree the "tacky" readily soluble nature or characteristic of the attaching surface, while setting to a slight degree the unvulcanizable component of the sole after the vulcanization step.

Heretofore composite rubber soles have been made consisting of layers or laminations of vulcanizable rubber and unmilled latex crepe; also of vulcanizable rubber and milled raw rubber entirely devoid of any vulcanization agent or any substance which upon the raw rubber being placed in contact with sulphur or other vulcanization element would cause the vulcanization element to impregnate the raw rubber, such milled raw rubber being chemically pure coagulated latex, free from any substance tending to assist in the vulcanizing process.

The unvulcanizable rubber used in my sole blank containing a small amount of sulphur is nevertheless normally sticky or "tacky" at its surface similarly to pure milled raw rubber, and if protected from the air remains for a considerable time in this sticky condition so as to be readily susceptible to the action of solvents, such as ether, gasoline, or other such well known solvents, to dissolve a film of rubber from the rubber. Upon the solvent evaporating, the rubber dissolved from the raw and softened surface will unite with rubber cement applied to the leather shoe sole, to form an efficient attaching means to a leather or other surface which will resist any strong efforts at separation.

A further object is to provide a sole blank as above described in which the unvulcanizable rubber surface of the sole contains a coloring pigment whereby the operator may readily distinguish the unvulcanizable surface from the vulcanizable tread portion of the sole before placing the sole blank in the mold for vulcanization, so that the operator may place the sole blank in the mold for vulcanization with the unvulcanizable surface upwardly.

Other minor objects of the invention will be hereinafter set forth.

I will explain the invention with reference to the accompanying drawing which illustrates one practical embodiment thereof to enable others familiar with the art to adopt and use the same; and will summarize in the claims the novel features of construction, and novel combinations of parts, for which protection is desired.

In said drawing:

Fig. 1 is a perspective view of an unvulcanized sole blank in the raw state, showing (by stippling) the unvulcanized attaching surface and the vulcanizable tread portion.

Fig. 2 is an enlarged section through the raw sole blank shown in Fig. 1 before vulcanization.

Fig. 3 is an enlarged section through the sole after vulcanization.

Fig. 4 is a plan view of the tread surface of the vulcanized rubber sole.

Fig. 5 is a plan view of the attaching surface of the vulcanized rubber sole showing the holland or prepared paper backing, utilized during the molding process to prevent the rubber from sticking to the mold, partly removed.

My novel composite rubber sole consists briefly of a lower tread portion A of vulcanized rubber having an upper attaching portion B of unvulcanized milled rubber of "tacky" or sticky nature.

The sole is made by mixing together in a mill the various ingredients which form the vulcanizable tread or lower portion A of the sole. This vulcanizable tread or lower portion A may comprise a rubber impregnated with such substances and in such quantities which will harden and toughen the rubber in the usual vulcanizing treatment. After the vulcanizable rubber ingredients are mixed and milled, the milled vulcanizable rubber is run through a calender and rolled into sheets of proper thickness to form the tread A.

I then mix and mill together the ingredients which form the unvulcanizable rubber, and place the milled unvulcanizable ingredients in the calender. The previously formed sheets of vulcanizable rubber A are then re-run through the calender and a thin film B of the unvulcanizable rubber is rolled and forced onto and into one face of the vulcanizable sheets A with heat and extreme pressure, whereby a composite sheet is formed as a solid unlaminated mass, as distinguished from separable layers or laminations of vulcanizable and unvulcanizable rubber cemented together by use of cement or solvents.

The calender rolls may be so adjusted that the thickness of the unvulcanizable portion applied to the vulcanizable portion will be such that the tackiness and desired characteristic of the attaching surface of the sole is not destroyed by the vulcanizing process.

By the term "unvulcanizable rubber" I do not mean a rubber composition chemically free from any vulcanizing agent such as sulphur, but a combination of ingredients which when the composite sole blank is vulcanized to vulcanize the tread layer A will not however vulcanize the "unvulcanizable" layer B; but the vulcanizing ingredients of the "unvulcanizable" layer B will be present in sufficient quantity to slightly "set" the unvulcanizable portion B so that it will not be quite as "tacky" or sticky as would be chemically pure raw rubber.

In manufacturing my sole I use for the unvulcanizable rubber surface B a compound of ingredients in substantially the following proportions:—

Smoked sheets (rubber) _____ 100 lbs.
Magnesia carbonate _____ 4 lbs.
Green color pigments _____ 10 lbs.
Sulphur _____ 4 oz.

I have found that pure milled raw rubber, free from any vulcanizing agent, has an extensive tackiness causing a tendency of the sole to "creep" on the shoe especially during hot weather; that in utilizing a small amount of sulphur in the "unvulcanizable" rubber the sulphur acts as a curing agent, and eliminates possibility of "creeping", and after the sole has been vulcanized the unvulcanizable portion is less "tacky" or sticky than would be the case if no sulphur were used; while at the same time the unvulcanizable rubber is readily susceptible to the action of solvents such as gasoline, ether, carbon tetrachloride, and other well known solvents which when used quickly dissolve a film of rubber upon the unvulcanizable rubber.

The composite sole material in the raw state is then blanked to proper shape for molding and the blanks placed in the mold, there being no plies in the rubber blank since it is compressed by the calender rolls under pressure and heat to form a solid mass.

The use of green color pigment in the unvulcanizable rubber is of particular service in connection with the vulcanizing step, for the pigment gives to the unvulcanizable side of the blank a greenish color readily distinguishable by the operator from the vulcanizable tread portion, eliminating any possibility of the operator making an error and putting the wrong face of the blank upward in the mold. The green side should be face up so that during vulcanization the tread lower portion of the sole will be vulcanized, while the upper green unvulcanizable surface will remain essentially unvulcanized. The soles are cured for about ten minutes at a boiler steam pressure of about 70 pounds, such short duration of vulcanization being insufficient to permit the sulphur in the vulcanizable portion migrating upwardly through the sole to any extent into the unvulcanizable upper stratum, and therefore when the soles are taken from the mold the tread lower portion will be sufficiently vulcanized while the upper green stratum will have the characteristics to a large degree of chemically pure raw rubber, i. e., the tackiness and stickiness and the ability to be readily dissolved for attachment to the leather sole upon application of solvents.

When molding these soles if I place a sheet of holland H over the unvulcanizable upper or green surface B the holland prevents sticking of the rubber to the mold during the process of vulcanization.

I claim:

1. The method of making composite unlaminated rubber soles consisting in milling a quickly vulcanizable rubber composition containing sulphur and forming said composition into a sheet; milling a slowly vulcanizable rubber composition containing a relatively small amount of sulphur; calendering a facing of the slowly vulcanizing composition onto the quick vulcanizing sheet; cutting the composite sheet into shoe blanks; and vulcanizing the blanks under heat and pressure to fully cure the quick vulcanizing composition and partially set the slow vulcanizing composition.

2. In a method as set forth in claim 1, incorporating substantially .25% sulphur in the slowly vulcanizable composition.

3. In a method as set forth in claim 1, incorporating a coloring pigment in the slowly vulcanizable composition for the purpose specified.

4. The method of making a composite unlaminated ruber sheet; consisting in milling a quickly vulcanizable rubber composition containing sulphur; and calendering same into a sheet; milling a uniform composition of rubber and a relatively small amount of sulphur sufficient to render it slowly and uniformly vulcanizable; calendering a facing of the slowly vulcanizable composition onto one face of the quickly vulcanizable sheet; vulcanizing the composite sheet for a duration of time sufficient to fully cure the quickly vulcanizable composition and partially set the slowly vulcanizable composition; and cutting the sheet into sole blanks.

5. The method of making a composite unlaminated rubber sheet; consisting in milling a quickly vulcanizable rubber composition containing sulphur; and calendering same into a sheet; milling a uniform composition of rubber and a relatively small amount of sulphur sufficient to render it slowly and uniformly vulcanizable; calendering a facing of the slowly vulcanizable composition onto one face of the quickly vulcanizable sheet; vulcanizing the composite sheet for a duration of time sufficient to fully cure the quickly vulcanizable composition and partially set the slowly vulcanizable composition; and forming soles from the sheet.

6. A rubber sole for boots and shoes comprising a tread portion composed of completely vulcanized rubber and a facing uniformly partially vulcanized to the tread portion, said facing containing sufficient sulphur to prevent "creeping" of the sole on the shoe, the exposed face of this facing being readily soluble by rubber cement.

7. In a sole as set forth in claim 6, the facing containing substantially .25% of sulphur.

8. In a sole set forth in claim 6, the facing containing a coloring pigment for the purpose specified.

WILLIAM F. SCHACHT.